United States Patent [19]

Hodkinson

[11] 4,267,697
[45] May 19, 1981

[54] HYDRAULIC MASTER CYLINDER

[75] Inventor: Harold Hodkinson, Coventry, England

[73] Assignee: Automotive Products Limited, Leamington Spa, England

[21] Appl. No.: 68,536

[22] Filed: Aug. 22, 1979

[30] Foreign Application Priority Data

Aug. 31, 1978 [GB] United Kingdom ............... 35109/78

[51] Int. Cl.³ .......................... B60T 11/28; F15B 7/08
[52] U.S. Cl. ......................................... 60/589; 60/594
[58] Field of Search ......................... 60/585, 589, 594; 251/238, 239, 241

[56] References Cited

U.S. PATENT DOCUMENTS

| | | | |
|---|---|---|---|
| 2,285,382 | 6/1942 | Goepfrich | 60/589 |
| 2,332,301 | 10/1943 | Cox | 60/589 |
| 2,928,245 | 3/1960 | Sjodin | 60/578 |
| 4,004,425 | 1/1977 | Pickering | 60/589 |

FOREIGN PATENT DOCUMENTS

| | | | |
|---|---|---|---|
| 1480342 | 8/1969 | Fed. Rep. of Germany | 60/589 |
| 2426153 | 12/1974 | Fed. Rep. of Germany | 60/585 |
| 513639 | 10/1939 | United Kingdom . | |

*Primary Examiner*—Abraham Hershkovitz
*Attorney, Agent, or Firm*—Kemon & Estabrook

[57] ABSTRACT

A hydraulic reservoir and master cylinder assembly having a piston with a blind bore for receiving an input rod, the piston having a breather valve therein provided with opening means operated by an abutment projecting laterally into the master cylinder bore and which is received into a slot in the piston. In order that the abutment be as short as possible and therefore that the slot be as shallow as possible, the piston carries a pivoted lever extending transversely of the piston and which is engageable with the abutment to operate the breather valve.

7 Claims, 3 Drawing Figures

HYDRAULIC MASTER CYLINDER

This invention relates to hydraulic reservoir and master cylinder assemblies used for, but not exclusively for, the braking and clutch systems of automobiles.

In a typical vehicle braking system, the hydraulic fluid housed in the reservoir is fed into the braking system to replenish lost fluid due to leaks, or to top up the system as it expands due to for example, wear on brake linings in the case of a braking system. The feeding of fluid into the high pressure side of the master cylinder actuating piston, when the piston is at the brake released position is called "breathing" and typically involves a one way valve mechanism so that fluid can feed freely from the reservoir into the braking system when the brakes are fully released, but fluid is not displaced into the reservoir when the brakes are applied.

One known "breathing" means is shown in British Pat. No. 513,639, is a one way valve arranged along the axis of the master cylinder piston and which abuts a hollow pin extending from the reservoir into the centre of the master cylinder bore.

The consequential groove required in the piston to accommodate movement of the piston is of such a depth that should the piston have a co-axial blind bore for receiving an input rod from either of the driver's brake pedal, a vacuum booster or air actuator, then the piston is necessarily relatively long so that the groove and bore do not interconnect.

This invention seeks to provide a method of operating a breather valve opening means so that the slot in the piston and the co-axial blind bore can be accommodated in a relatively short piston.

According to this invention there is provided a hydraulic reservoir and master cylinder assembly having a piston with a blind bore for receiving an input rod, the piston having a breather valve therein provided with opening means operated by an abutment projecting laterally into the master cylinder bore and which is received into a slot in the piston characterised in that the piston carries a pivoted lever extending transversely of the piston and which is engageable with the abutment to operate the breather valve so that only a relatively short abutment and a consequently shallow piston slot are required.

An advantage of this construction is that a very deep co-axial blind bore can be used, and the deep bore helps to provide lateral support for the input rod and also the deeper the blind bore the less likelihood there is of the piston tending to tilt during application of the braking load.

The invention will be described by way of example and with reference to the accompanying drawings in which.

Figure 1:
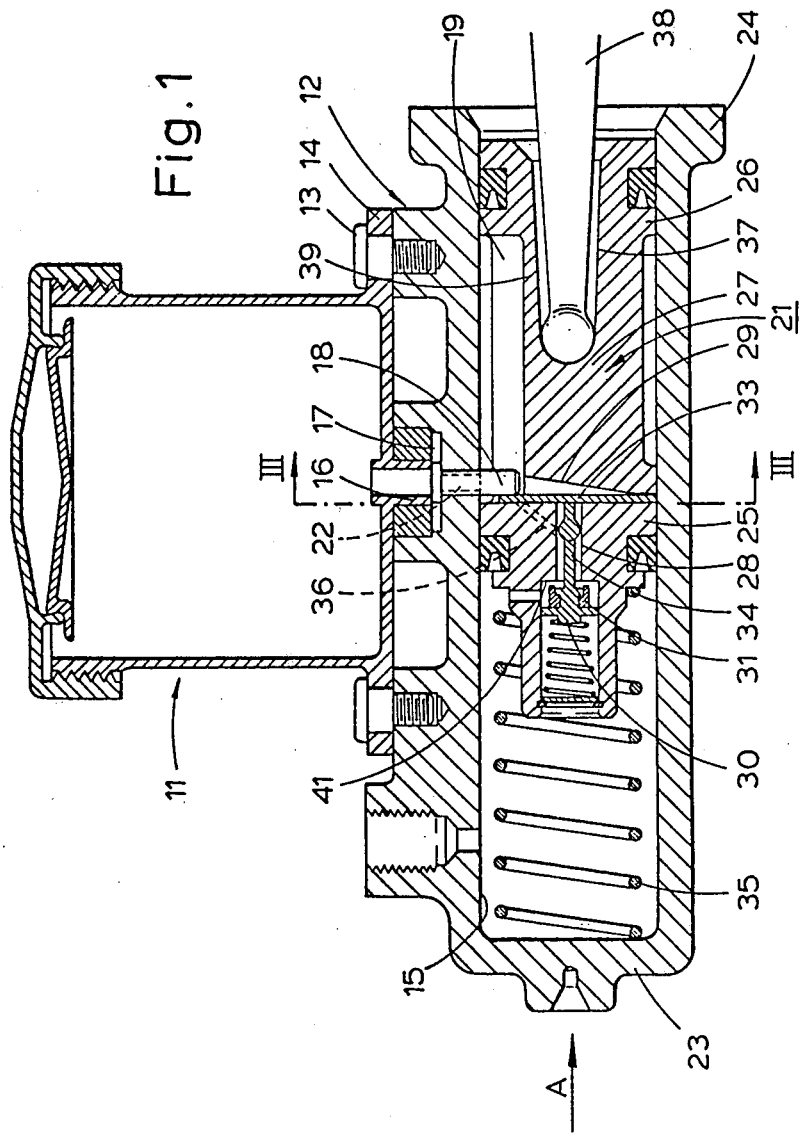
FIG. 1 is a longitudinal cross-section through a hydraulic reservoir and master cylinder assembly according to this invention.
Figure 2:
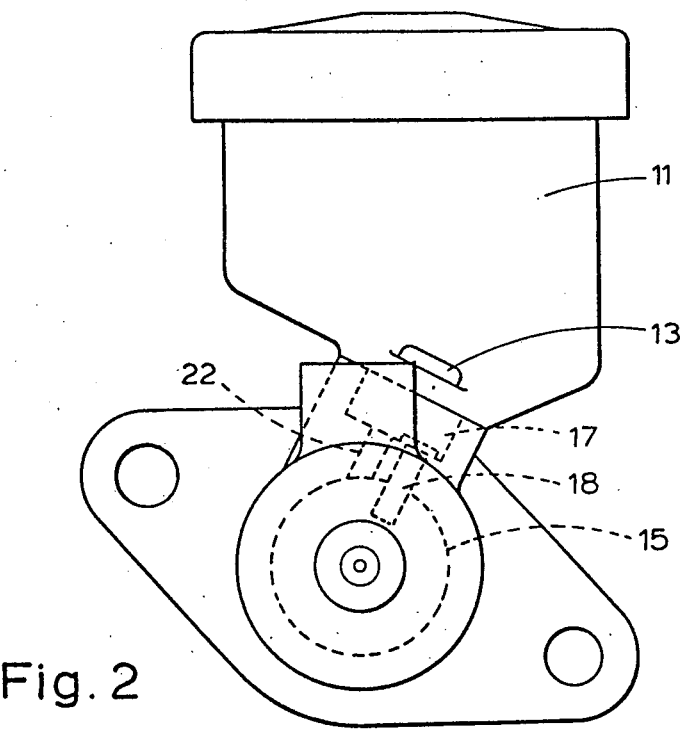
FIG. 2 is a view in the direction of arrow A of the assembly shown in FIG. 1, showing the pin, fluid input passageway, and master cylinder bore in dotted lines.
Figure 3:
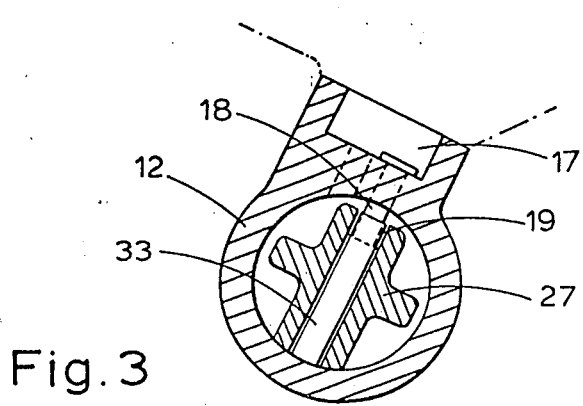
FIG. 3 is a section of the line III—III of FIG. 1, through the master cylinder only.

The hydraulic master cylinder and reservoir assembly shown in FIG. 1, FIG. 2 and FIG. 3 comprises a polypropylene hydraulic reservoir 11 secured to a master cylinder body 12 by screws 13 which pass through lugs on the reservoir 11. A fluid connection between the reservoir 11 and master cylinder bore 15 is provided by a hollow spigot 16 in the base of the reservoir which is sealingly connected with a cylindrical recess 17 in the external surface of the master cylinder body 12. A solid pin 18 having its head in the recess 17 extends radially through the wall of the master cylinder into the bore 15 so as to engage in an axial slot 19 in the mid-portion of the master cylinder piston 21. A passageway 22 provides a fluidflow path between the recess 17 and the bore 15 and is substantially parallel with the pin 18.

The master cylinder bore 15 is a blind bore having an end wall 23 and a mouth 24. The piston 21 is a spool comprising two cylindrical portions 25 and 26, each of which seals against the wall of the bore, and which are joined by an axially extending mid-portion 27 having a cruciform cross-section, and the piston is arranged so that the first cylindrical portion 25 lies adjacent the end wall 23. The first cylindrical portion 25 has an axial stepped bore 28 therein which has its smaller diameter portion connecting with a diametral slot 29 in the mid-portion 27 which interconnects with the axial slot 19.

The axial stepped bore 28 has a breather constituted by a one way valve 30 located therein. The valve 30 is spring loaded towards the shoulder 41 of the stepped bore 28 and has an annular seal 31 for sealing against said shoulder 41.

The diametral slot 29 is substantially 'V' shaped in longitudinal cross-section (longitudinal relative to the master cylinder) having that wall adjacent the portion 25 arranged to be vertical and the opposite wall therefore being inclined, and the wider end of the 'V' slot opens into axial slot 19. A lever 33 is a close fit in the slot 29 so that the lever can move axially but not transversely relative to the master cylinder. One end of the lever 33, fits into the apex of the 'V' slot 29 so that the lever pivots about said one end and the other end of the lever is free to move axially at the wider end of the slot, thus the lever 33 can rock about its one end. The lever 33 is of such a length that it overlaps with the pin 18 located in the axial groove 19, the lever being located on the blind end side of the pin.

The one way valve 30 has an axial stem 34 that projects through the stepped bore to contact the lever 33, and when the piston 21 is moved towards the end wall 23 against a spring 35, so as to generate hydraulic pressure, the lever 33 is moved out of abutment with the pin 18 and the spring loaded valve 30 pushes the lever 33 clockwise about its one end thus seating the seal 31 against the shoulder 41, and closing the bore 28 to fluid flow.

When the hydraulic pressure is released, the piston 21 is moved by the spring 35 back towards the mouth 24 until the lever 33 abuts the pin 18, continued return movement of the piston 21 then causes the lever to pivot anticlockwise thereby causing the one way valve 30 to open and allow fluid to flow through the axial bore 28 thus allowing the hydraulic system to breath. The return movement continues until the lever 33 abuts the vertical wall of the slot 29, so that the lever 33 is sandwiched between the pin and the portion 25 of the piston, the pin 18 then preventing continued movement of the piston towards the mouth 24. A fluid cross passageway 36 is provided to allow fluid to pass freely at all times from the face of the cylindrical portion 25 adjacent the cruciform section 27, into the stepped bore 28.

The end portion 26 adjacent the mouth 24 of the bore 15 has an axial input bore 37 into which an input rod 38 is fitted. The bore 37 extends into the central cruciform portion 27 and axially overlaps with the slot 19, there being a web 39 of material between the input bore and the slot 19. The bore 37 is a blind bore of sufficient axial depth when compared with its diameters to provide some lateral support for the input rod 38 and prevent appreciably the rod having a large degree of lateral movement. The bore 37 is also of sufficient depth that the rod 38 will not become disengaged from the bore due to different relative return rates when the rod is withdrawn.

Also by having a deep input bore 37 the end of which is at least half the length of the piston 21 the tendency of the piston 21 to tilt on application of the braking input load is reduced.

I claim:

1. A hydraulic reservoir and master cylinder assembly having:
    a master cylinder body;
    a master cylinder bore with the body;
    a piston slideable in the master cylinder bore:
    an input rod for transmitting loads to the piston;
    a blind bore defined in the piston, co-axial therewith for receiving the input rod;
    a stepped bore in the piston, co-axial therewith;
    a breather valve located in the stepped bore;
    an axial slot in the outer surface of the piston an which axially overlaps with but does not interconnect with the stepped bore;
    an abutment projecting laterally into the master cylinder bore and which is accommodated in said slot thus allowing the piston to slide axially;
    and a lever pivoted to the piston and extending substantially diametrally thereof to be engaged with the abutment to operate the breather valve such that only a relatively short abutment and consequently shallow piston slot are required.

2. An assembly as claimed in claim 1, wherein the abutment is a pin extending radially into the master cylinder bore, and the lever is arranged diametrally thereto.

3. An assembly as claimed in claim 2, wherein there is a recess in the external surface of the master cylinder body and said pin has a head located in the recess, and the hydraulic reservoir has a hollow spigot in the base thereof and said spigot is received in said recess to provide an inlet connection for hydraulic fluid to enter the master cylinder bore.

4. An assembly as claimed in claim 3, wherein at least one fluid inlet passageway is provided in the master cylinder body and which connects the recess to the master cylinder bore and runs alongside the pin.

5. An assembly as claimed in claim 1, wherein the abutment also provides a stop for limiting the return movement of the piston when the hydraulic pressure is released.

6. An assembly as claimed in claim 1 wherein the blind bore has a sufficient depth when compared to its diameter so as to restrict the lateral movement of the input rod.

7. An assembly as claimed in claim 1 or 2, wherein the piston is a spool and the deoth of the blind bore is at least half the length of the piston, thus reducing the tendency for the piston to tilt.

* * * * *